(12) United States Patent
Schötz et al.

(10) Patent No.: US 6,622,527 B2
(45) Date of Patent: Sep. 23, 2003

(54) ADJUSTING THE HYDROGEN CONTENT OF A PREFORM FOR AN UV-OPTICAL FIBER

(75) Inventors: Gerhard Schötz, Aschaffenburg (DE); Jan Vydra, Hanau (DE)

(73) Assignee: Heraeus Quarzglas GmbH, Hanau (DE)

( * ) Notice: Subject to any disclaimer, the term of this patent is extended or adjusted under 35 U.S.C. 154(b) by 57 days.

(21) Appl. No.: 10/154,511

(22) Filed: May 23, 2002

(65) Prior Publication Data

US 2002/0170320 A1 Nov. 21, 2002

Related U.S. Application Data

(62) Division of application No. 09/259,856, filed on Mar. 1, 1999, now abandoned.

(30) Foreign Application Priority Data

Nov. 4, 1998 (DE) .......................................... 198 50 736

(51) Int. Cl.$^7$ .............................................. C03B 37/018
(52) U.S. Cl. ............................. 65/385; 65/413; 65/424
(58) Field of Search ......................... 65/426, 385, 413, 65/424

(56) References Cited

U.S. PATENT DOCUMENTS

| | | | | |
|---|---|---|---|---|
| 4,445,918 A | * | 5/1984 | Modone et al. ................ 65/379 |
| 4,553,995 A | * | 11/1985 | Chigusa ........................ 65/411 |
| 5,086,352 A | * | 2/1992 | Yamagata et al. ........... 359/350 |
| 5,267,343 A | * | 11/1993 | Lyons et al. .................. 385/141 |
| 5,326,729 A | * | 7/1994 | Yaba et al. .................... 501/54 |
| 5,364,433 A | * | 11/1994 | Nishimura et al. ........... 65/17.4 |
| 5,410,428 A | * | 4/1995 | Yamagata et al. ........... 359/350 |
| 5,509,101 A | * | 4/1996 | Gilliland et al. ............. 385/142 |
| 5,679,125 A | * | 10/1997 | Hiraiwa et al. ................ 65/397 |
| 5,983,673 A | * | 11/1999 | Urano et al. .................. 65/30.1 |
| 6,333,283 B1 | * | 12/2001 | Urano et al. ................... 501/54 |

FOREIGN PATENT DOCUMENTS

| | | |
|---|---|---|
| EP | 62 191434 | 8/1987 |
| EP | 0 401845 | 12/1990 |
| EP | 0 483477 | 5/1992 |
| EP | 0 483752 | 5/1992 |
| EP | 0 622340 | 11/1994 |
| EP | 0 879799 | 11/1998 |
| JP | 11 180731 | 7/1999 |
| WO | 98 40319 | 9/1998 |
| WO | 00 15570 | 3/2000 |

* cited by examiner

*Primary Examiner*—John Hoffmann
(74) *Attorney, Agent, or Firm*—Fulbright & Jaworski L.L.P.

(57) ABSTRACT

A core glass for making a preform for an optical fiber particularly useful for the transmission of ultraviolet radiation and methods for making the core glass are disclosed. The core glass is obtained by the flame hydrolysis of a silicon compound, deposition of finely granular $SiO_2$ on a substrate with direct vitrification and formation of a synthetic quartz glass. The quartz glass has a hydrogen content of less than $1 \times 10^{18}$ molecules/cm$^3$.

8 Claims, 8 Drawing Sheets

ADJUSTING THE HYDROGEN CONTENT OF A PREFORM FOR AN UV-OPTICAL FIBER

This application is a Divisional application of Ser. No. 09/259,856 which was filed on Mar. 1, 1999 and is now abandoned.

The present invention relates to a core glass for the preparation of a preform for an optical fiber, especially an optical fiber for the transmission of ultraviolet radiation, obtained by flame hydrolysis of a silicon compound, deposition of finely granular $SiO_2$ on a substrate with direct vitrification and formation of a synthetic quartz glass.

The invention furthermore relates to a preform for an optical fiber, especially for an optical fiber for the transmission of UV radiation, with a core glass of synthetic quartz glass, obtained by flame hydrolysis of a silicon compound, deposition of finely granular $SiO_2$ on a substrate with direct vitrification and formation of a synthetic quartz glass which is enveloped in a jacket glass.

The invention furthermore relates to a method for the production of a core glass for a preform for an optical fiber, especially for an optical fiber for the transmission of UV radiation, comprising the production of synthetic quartz glass by flame hydrolysis of a silicon compound, deposition of finely granular $SiO_2$ on a substrate with direct vitrification and formation of the synthetic quartz glass.

The invention furthermore relates to a method for the manufacture of an optical fiber, especially an optical fiber for the transmission of UV radiation, by drawing from a preform which comprises a core glass of synthetic quartz glass which is formed by flame hydrolysis of a silicon compound, deposition of finely granular $SiO_2$ on a substrate with direct vitrification and formation of the synthetic quartz glass.

Preforms for optical fibers generally have a core which is enveloped by a jacket of a material with a lower index of refraction. Preforms are also known which consist only of a so-called core rod of core material, the jacket or a portion of the jacket being applied to the core material when the fiber is drawn from the preform. For the manufacture of preforms for optical fibers from synthetic quartz glass, essentially three methods have become established which are referred to in the technical literature as VAD processes (vapor phase axial deposition), OVD processes (outside vapor-phase deposition), and MCVD processes (modified chemical vapor deposition). Furthermore, the production of preforms by the so-called rod-in-tube technique is known. In all these methods a core glass of synthetic quartz glass is generally made by the flame hydrolysis of a silica containing compound by producing $SiO_2$ particles and depositing them and vitrifying them on a substrate. The substrate can be, for example, a quartz glass tube which consists of a jacket glass. The vitrification of the $SiO_2$ particles can be performed directly during its deposition on the substrate (referred to hereinafter as direct vitrification), or in a separate sintering process as in the case of the so-called "soot process." Both variant vitrifications result in a dense, transparent, high-purity quartz glass.

On account of their porosity, so-called soot bodies are simply cleaned, doped or otherwise treated prior to vitrification. On the other hand, directly vitrified synthetic quartz glass has advantages for some applications in connection with the transmission of short-wave UV radiation. Due to the presence of hydrogen and oxygen during the flame hydrolysis, quartz glass made by direct vitrification generally contains a relatively high OH content and a certain concentration of hydrogen.

Depending on the method, the jacket glass is produced in a separate process (OVD, MCVD, plasma process, rod-in-tube technique), or the jacket glass and the core glass are produced simultaneously as in the so-called VAD process. To change the index of refraction of the quartz glass, a dopant is usually added, such as germanium, for example, to increase the index, or fluorine and boron to lower the index of refraction.

The present invention sets out from these long-known processes for the production of a preform, the core glass of the preform being made by direct vitrification. By the heating and drawing of the preform thus prepared optical fibers are obtained from it.

Such optical fibers are used not only for the transmission of information in the form of optical signals in communication technology, but also increasingly for the transmission of high-energy UV radiation, as for example in medical technology, in material machining, in ultraviolet spectroscopy or in microlithography apparatus for the production of highly integrated circuits in semiconductor chips. The illumination systems of modern microlithography apparatus are equipped with excimer lasers which emit high-energy, pulsed UV radiation of a wavelength of 248 nm (KrF lasers) or 193 nm (ArF lasers). It is known that such short-wave UV radiation can produce structural defects in the quartz glass of the optical fibers and resultant absorptions. For example, an excess oxygen defect, in which a non-bridge building oxygen atom is present (a so-called NBOH center) results in a relatively broad absorption band at a wavelength of about 265 nm. A defect in which only three oxygen atoms (instead of four) are bound to a silicon atom, and which is called an E' center, produces an absorption band around 215 nm. A review of structural defects in quartz glass is given by David L. Griscom in "Defect Structure of Glasses", J. Non-Cryst. Solids, 73 (1985), pages 55–77.

The influence of the chemical composition of quartz glass on the damage that can be done by irradiation with high-energy UV light is described, for example, in European Patent Application A1 401 845. Accordingly, a high stability in radiation was found in high-purity quartz glass containing a relatively high OH content of 100 wt.-ppm to about 1000 wt.-ppm and at the same time a relatively high hydrogen concentration of at least $5 \times 10^{16}$ molecules per $cm^3$ (with respect to the volume of the quartz glass). The good influence of hydrogen on stability in radiation can be explained by the fact that it can contribute to the healing of defects and thus to a slower increase of the adsorption caused by radiation. On account of this action of hydrogen it is recommended in European Patent Application A1 401 845 that optical components which must satisfy stringent requirements in regard to stability under radiation be charged with hydrogen.

In European Patent Application EPA1 590 199 a description is given of core glass of the kind for the production of an optical fiber for the transmission of high-energy UV light a preform made with the use of the core glass, a method for the production of the core glass, and a generic process for the production of such an optical fiber. The prior-art core glass is a pure synthetic quartz glass which is made by the flame hydrolysis of methyl trimethoxysilane. The core glass is substantially free of chlorine, its hydroxyl group content (OH content) is between 10 and 1000 ppm, and it contains fluorine in a concentration ranging between 50 and 5000 ppm. To prepare a preform for a so-called graded index fiber a core glass rod is provided with a tube of core glass by the "rod-in-tube" technique wherein the jacket glass consists of fluorine-doped or boron-doped quartz glass. An optical fiber is drawn from the preform by heating the preform to about 2000° C.; it softens beginning at one end, and the fiber is drawn from the softened part. The known optical fiber shows, in comparison to other fibers, good stability under high-energy UV radiation. For applications in which an especially slow increase of the radiation-induced absorption, a low transmission loss, and a good long-term stability are important, the known optical fiber, however, is inadequate.

The invention is therefore addressed to the problem of optimizing the stability of a core glass for the production of a preform, obtained by direct vitrification, under ultraviolet radiation, especially under high-energy ultraviolet radiation of a wavelength of 250 nm and shorter, with a view to lower absorption, slower increase of absorption and greater long-term stability.

The invention is furthermore addressed to the problem of making available a preform made by the use of the core glass, from which an optical fiber can be drawn which has a higher stability than known fibers have against ultraviolet radiation of a wavelength of 250 nm and shorter.

Further purposes of the invention are to devise a simple method for the production of such a core glass, plus an optical fiber with optimized stability against ultraviolet radiation.

With regard to the core glass, this problem is solved according to the invention, setting out from the core glass described in the beginning, in that the quartz glass has a hydrogen content of less than $1 \times 10^{18}$ molecules/cm$^3$.

The core glass is used to prepare a preform from which optical fibers are drawn. To draw fibers the preform is heated and deformed plastically. It has been found that in this hot deformation of the preform, so-called precursor defects are produced, from which other structural defects can develop by radiation with short-wave UV light. One precursor defect is, for example, a bond between silicon and hydrogen (hereinafter called a Si—H bond). Many of these Si—H bonds occur in the fiber when the core glass of the preform consists of quartz glass with a hydrogen content of more than $1 \times 10^{18}$ molecules/cm$^3$. This can be explained by the fact that the high temperatures occurring when the fibers are drawn and the severe plastic deformation of the quartz glass results in structural defects, such as free bonds of silicon, are formed, which due to the presence of hydrogen become saturated, with the formation of Si—H bonds. The mechanism can be represented schematically by the following formula:

The saturation of free bonds forming when fibers are drawn, due to the hydrogen present, leads to a high precursor concentration (Si—H bonds) in the fiber core. In the publication of J. E. Shelby, "Molecular diffusion and solubility of hydrogen isotopes in quartz glass", J. Appl. Physics, Vol. 48 (1977), No. 8, pages 3387 ff, it is described how Si—H bonds can form at high temperatures in quartz glass containing hydrogen. It is true that Si—H bonds do not themselves absorb in the relevant UV wavelength range; the bonds, however, are relatively weak and, upon subsequent irradiation with short-wave ultraviolet light, they are easily broken (in a so-called "single photon process") with the formation of absorbing E' centers. This process is described in detail in "Comparison of the influence of the fictive and the annealing temperature on the UV transmission properties of synthetic fused silica" by V. Uhl et al. in Appl. Phys. A, 65 (1997), pages 457–462. Since E' centers absorb in the ultraviolet wavelength range, this conversion mechanism, which is represented schematically by the following formula, has a negative effect on the radiation stability of the fibers.

This disadvantage is not shown, however, by an optical fiber which has been drawn from a preform containing a core glass of the invention. For this purpose the hydrogen content of the core glass prior to hot deformation in the drawing of the fiber is adjusted to a value below $1 \times 10^{18}$ molecules/cm$^3$. It has been found that in this case the precursor concentration in the fiber core is decidedly lower after the fiber is drawn. Evidently the formation of Si—H bonds in the drawing of the fiber is suppressed due to the low hydrogen content. The behavior of such an optical fiber in connection with high-energy UV light is characterized by a definitely slower initial rise of the induced absorption. This can be attributed to the low precursor concentration in the fiber core.

The core glass of the invention is made by "direct vitrification." Fibers from preforms whose core glasses were produced by the "soot method" or by the "plasma method" showed a so-called "drawing band" in the UV wavelength range around 265 nm, this occurred whenever the core glass otherwise was the same as the core glass of the invention. This might be connected with the specific conditions of manufacture.

The hydrogen content is determined by a Raman measurement which has been described by Khotimchenko et al., "Determining the Content of Hydrogen Dissolved in Quartz Glass Using the Methods of Raman Scattering and Mass Spectrometry" in "Zhurnal Prikladnoi Spektroskopii" Vol. 46, No. 6 (1987), pages 987 to 991. The unit of measurement, "molecules/cm$^3$" relates to the number of hydrogen molecules per cm$^3$ of quartz glass. It would be optimum if the hydrogen content over the entire radial cross section of a cylindrical core glass would be below the stated concentration. Often the hydrogen content over the radial cross section of the core glass, however, is not uniformly distributed. Depending on the conditions of production, maxima of the hydrogen concentration can be in the marginal area or in the central area of the core glass. Under certain circumstances, such maxima, especially in the marginal areas, can be above $18^{18}$ molecules/cm$^3$ and yet be harmless. It is assumed that, for a core glass to be suitable in the meaning of this invention, the hydrogen concentration in its central area is essential. Therefore, in the meaning of the present invention, the hydrogen content is understood to be the hydrogen and/or deuterium concentration determined by a Raman measurement in the center of the radial core glass cross section, the diameter of the measuring beam being less than 1 mm. The detection limit for the hydrogen content in this method of measurement is at this time approximately $2 \times 10^{16}$ molecules/cm$^3$ by the conventional measurement times. In the case of very long integration periods (for example 24 hours or longer) the accuracy of measurement can be increased to about $2 \times 10^{15}$ molecules/cm$^3$.

An optical fiber that is drawn from a preform in which the core glass consists of quartz glass and has a hydrogen content of no more than $1 \times 10^{17}$ molecules/cm$^3$ proves to be desirable with regard to UV damage.

It has proven to be advantageous if the quartz glass has a hydroxyl group content of at least 100 wt.-ppm. Hydroxyl groups improve the resistance of the core glass to radiation.

The hydroxyl group content in the meaning of this invention is measured, like the hydrogen content, in the central part of the core glass, although the OH content is determined by spectroscopy.

A preferred core glass consists of quartz glass having a hydrogen content of at least $2 \times 10^{15}$ molecules/cm$^3$. From a preform with a core glass in which the hydrogen content is set below this amount an optical fiber is obtained which at approximately 265 nm has an absorption band which gets more pronounced under UV radiation. This absorption band indicates NBOH centers. From this it is to be concluded that the hydrogen content of the quartz glass has, with regard to damage by UV radiation, an optimum that is between $1 \times 10^{18}$ molecules/cm$^3$ and $2 \times 10^{15}$ molecules/cm$^3$, preferably between $1 \times 10^{17}$ molecules/cm$^3$ and $2 \times 10^{15}$ molecules/cm$^3$. One possible explanation of this is that it takes a certain hydrogen content in the core glass of the preform to prevent the formation of NBOH centers and/or defects that are precursors of NBOH centers. The damage to the fibers that has been described becomes undesirably observable only in the transmission of UV radiation of a wavelength within the range of the absorption bands (e.g., 248 nm, but not at 193 nm). Anyway, this disadvantageous effect of a low hydrogen content can be compensated by an additional measure as it will be explained further on in connection with a method for the production of an optical fiber.

With regard to the preform for an optical fiber, the problem referred to above is solved according to the invention, setting out from the preform described in the beginning, by the fact that the core glass has a hydrogen content of less than $1 \times 10^{18}$ molecules/cm$^3$.

An optical fiber is drawn from the preform. To draw the fiber, the preform is heated and thus plastically deformed. It has been found that, by this hot shaping of the preform, so-called precursor defects are produced in the quartz glass, from which other structural defects can develop upon irradiation with short-wave UV radiation. A precursor defect, for example, is a bond between silicon and hydrogen (hereinafter called an Si—H bond). Many of these Si—H bonds occur in the fiber if the core glass of the preform consists of quartz glass with a hydrogen content of more than $1 \times 10^{18}$ molecules/cm$^3$. This can be explained by assuming that the high temperatures involved in fiber drawing and the severe plastic deformation of the quartz glass results in structural defects, as for example free bonds of silicon which become saturated by the hydrogen present, with the formation of Si—H bonds. The mechanism can be represented schematically by the following formula:

The saturation of free bonds that develop in fiber drawing due to the presence of hydrogen leads to a high precursor (Si—H bonds) concentration in the fiber core. In the publication of J. E. Shelby, "Molecular diffusion and solubility of hydrogen isotopes in vitreous silica", J. Appl. Physics Vol. 48 (1977) No. 8, pages 3387 ff, it is described that, in quartz glass containing hydrogen, Si—H bonds can form at high temperatures. Si—H bonds themselves do not absorb in the relevant UV wavelength range; the bonds, however, are relatively weak and, in subsequent irradiation with short-wave UV light, they can easily (in a so-called "single-photon process") break up with the formation of absorbing E' centers. This process is further described in "Comparison of the influence of the fictive and the annealing temperature on the UV transmission properties of synthetic fused silica" by V. Uhl et al., in Appl. Phys. A, 65 (1997), pages 457–462. Since E' centers absorb in the UV wavelength range, this transformation mechanism has a negative effect on the resistance of optical fibers to radiation.

This disadvantage is not, however, shown by an optical fiber which has been drawn from a preform of the invention. The hydrogen content of the core glass of the preform is adjusted to a level below $1 \times 10^{18}$ molecules/cm$^3$ before the hot forming operation. It has been found that, in this case, the precursor concentration in the fiber care is definitely lower after the fiber is drawn. Apparently, the formation of Si—H bonds when fiber is drawn is suppressed on account of the low hydrogen content. The damage resistance of such an optical fiber to high-energy UV radiation is characterized by a definitely slower initial increase of the induced absorption. This can be attributed to the low precursor concentration in the fiber core.

The core glass of the preform of the invention is produced by "direct vitrification." Fibers from preforms whose core glasses were made by the "soot process" or by "plasma processes" showed in the UV wavelength range around 265 nm a so-called "drawing barrier" which occurred even when the core glass otherwise corresponded to the above-described core glass according to the invention. This might be connected with the specific conditions of production.

The determination of the hydrogen content is performed similar to the determination described above which is performed on the core glass of the invention.

Especially good damage resistance is shown by an optical fiber which is drawn from a preform in which the core glass consists of quartz glass having a hydrogen content of no more than $1 \times 10^{17}$ molecules/cm$^3$.

It has proven advantageous that the quartz glass has a hydroxyl group content of at least 100 wt.-ppm. The hydroxyl group content improves the radiation resistance of the preform and of a fiber drawn from it. The determination of the hydroxyl group content of the preform is performed similarly to the above-explained determination of the hydroxyl group content in the core glass.

In an especially preferred embodiment, the quartz glass of the core glass has a hydrogen content of at least $2 \times 10^{15}$ molecules/cm$^3$. From a preform with a core glass in which the hydrogen content is set below this level, an optical fiber is obtained which at about 265 nm has an absorption band which gets more pronounced under UV radiation. This absorption band indicates NBOH centers. From this it can be concluded that the hydrogen content of the quartz glass has an optimum resistance to damage by ultraviolet radiation, which is situated between $1 \times 10^{18}$ molecules/cm$^3$ and $2 \times 10^5$ molecules/cm$^3$, preferably between $1 \times 10^{17}$ molecules/cm$^3$ and $2 \times 10^{15}$ molecules/cm$^3$. One possible explanation for this is that a certain hydrogen content in the core glass of the preform is necessary in order to prevent the formation of NBOH centers and/or precursor defects for NBOH centers when fibers are drawn. The damage to the fibers to damage as described becomes undesirably apparent only in the transmission of UV radiation of a wavelength situated in the range of the absorption band (e.g., 248 nm, but not at 193 nm). In any case, this disadvantageous effect of a low hydrogen content can be compensated by an additional measure, as it will be explained further below in connection with a method for the production of an optical fiber.

In a case in which the preform has a jacket of synthetic quartz glass, the latter will also advantageously have a hydrogen content of less than $1 \times 10^{18}$ molecules/cm$^3$, preferably of less than $1 \times 10^{17}$ molecules/cm$^3$. This will reduce the danger of hydrogen diffusing from the jacket into the core glass as the fiber is drawn.

As regards the process of producing a core glass of a preform for an optical fiber, the problem stated above is solved, setting out from the method described above, by adjusting the hydrogen content of the quartz glass to a level below $1 \times 10^{18}$ molecules/cm$^3$.

Due to the presence of hydrogen during the production of the core glass, the latter will contain hydrogen after vitrification. In a case in which the hydrogen concentration is above the above-given maximum limit of $1 \times 10^{18}$ molecules/cm$^3$, it is necessary to drive the hydrogen out of the core glass.

In the method of the invention, the hydrogen content of the core glass is adjusted to a level below $1 \times 10^{18}$ molecules/cm$^3$ before a fiber is drawn from the preform. To adjust the hydrogen content, the core glass can be subjected to a separate treatment; the adjustment, however, can also be made in connection with a process step in the course of the production of the preform (for example in the production of the jacket glass by the OVD method), wherein the hydrogen content of the entire preform (core glass plus jacket glass) is usually influenced.

With regard to the effects of the targeted hydrogen content on the resistance to damage in an optical fiber that is drawn from a preform using the core glass, see the explanations above concerning the core glass of the invention. An important idea of the invention is to keep the concentration of Si—H bonds in the fiber core as low as possible, since they can act as precursor defects and impair the resistance of the fiber to damage by UV radiation.

A method has proven to be especially advantageous in which the hydrogen content of the quartz glass is adjusted to a value below $1 \times 10^{17}$ molecules/cm$^3$. An optical fiber which is obtained from a preform thus prepared is characterized by an especially good long-term stability under high-energy UV radiation, and an especially low level of absorption induced by UV radiation.

In this connection a method has also proven practical in which the hydroxyl group content of the quartz glass is adjusted to at least 100 wt.-ppm. Hydroxyl groups improve the stability of the core glass under radiation. For the adjustment of the hydroxyl group content a separate treatment is usually unnecessary, since usually it is above the stated lower limit in the course of the manufacture of the core glass. The hydroxyl group content is measured, like the hydrogen content, in the central area of the core glass, in which case, however, the hydroxyl group content is determined spectroscopically.

In a preferred process variant, the hydrogen content of the quartz glass is adjusted to a level of at least $2 \times 10^{15}$ molecules/cm$^3$. From a preform with a core glass in which the hydrogen content is adjusted below this level an optical fiber is obtained which may have undesirable resistance to UV damage. See the above explanations given in connection with the core glass of the invention.

For the sake of resistance to damage by UV radiation, the hydrogen content of the quartz glass has an optimum which lies between $1 \times 10^{18}$ molecules/cm$^3$ and $2 \times 10^{15}$ molecules/cm$^3$, preferably between $1 \times 10^{17}$ molecules/cm$^3$ and $2 \times 10^{15}$ molecules/cm$^3$. In a core glass with a hydrogen content below the stated bottom limit, therefore, it is advantageous to enrich it with hydrogen. Enriching the core glass with hydrogen can be performed in a separate treatment step, or on the completed preform, or in connection with a process step.

A possible explanation of the observed effect is that it requires a certain content of hydrogen in the core glass of the preform in order to avoid the formation of NBOH centers and/or precursor defects for NBOH centers when the fiber is drawn. NBOH centers produce a broad absorption band at a wavelength of about 265 nm. They therefore make themselves undesirably manifest, especially in the case of the transmission of UV radiation of a wavelength within this absorption band, yet not as manifest in the transmission of UV radiation of a wavelength below 200 nm. Anyway, this disadvantageous effect produced by too low a hydrogen content in the core glass can be compensated by an additional measure, as will be explained further below in connection with a method for the manufacture of an optical fiber.

In a preferred procedure, a quartz glass containing hydrogen is produced, in which the adjustment of the hydrogen content entails a hydrogen reduction treatment to which the quartz glass containing hydrogen is subjected, resulting in the formation of the synthetic quartz glass. Owing to the presence of hydrogen in the case of manufacture by flame hydrolysis, the quartz glass after vitrification contains hydrogen. It is therefore generally necessary to drive the hydrogen out of the quartz glass. By the hydrogen reduction treatment the hydrogen content can be repeatably adjusted to a second concentration after setting out from an initial high concentration. The preforms thus made therefore yield optical fibers with a definite resistance to UV damage.

The quartz glass is subjected to the hydrogen reduction treatment usually in a separate process step. The hydrogen reduction treatment can also, however, be performed on the complete preform (core glass+jacket glass), or can take place in connection with a process step for the preparation of the preform, for example during the deposition of jacket glass onto the core glass.

The adjustment of the hydrogen content advantageously comprises a thermal treatment of the quartz glass, a vacuum treatment, and/or treatment in a chemically reactive atmosphere. The said variant treatments can be used alternatively or cumulatively. But a thermal treatment (referred to hereinafter as "annealing") has proven to be especially effective. The annealing is performed in a hydrogen-free atmosphere, for example under inert gas or in a vacuum, in order to reduce the hydrogen content of the quartz glass, or in an atmosphere containing hydrogen under standard pressure or excess pressure, in order to increase the hydrogen content of the quartz glass. Hydrogen is diffused in quartz glass more rapidly by the temperature increase in annealing. As hydrogen is driven out, first the regions near the surface are deprived, and later the central regions of the core glass. It is therefore necessary to make sure that the hydrogen content is sufficiently removed, especially in that region which is most severely stressed optically when the fibers made from the core glass are used as intended; generally that region is precisely the central regions of the fiber. On the other hand, by annealing the core glass the hydrogen content can be reduced below the above-mentioned minimum of $2 \times 10^{15}$ molecules/cm$^3$, which can prove to be disadvantageous.

The annealing of quartz glass for optical components is a frequently used procedure which usually serves to relieve mechanical stress which impair the optical properties of the glass. The annealing of the core glass here proposed for adjusting the hydrogen content differs from the known annealing processes in its purpose, performance and outcome. Thus the core glass is annealed preferably at a temperature of at least 600° C., the heating time being determined by the thickness of the core glass and the hydrogen content to be established. The latter amounts, according to the invention, to less than $1 \times 10^{18}$ molecules/ cm$^3$, preferably no more than $1\times10^{17}$ molecules/cm$^3$ and at least $2\times10^{15}$ molecules/cm$^3$.

With regard to the process for making an optical fiber, the problem stated above is solved by the invention, setting out from the drawing process mentioned above, in that the core glass is adjusted before drawing to a hydrogen content of less than $1\times10^{18}$ molecules/cm$^3$.

On account of the presence of hydrogen during the process of making the core glass, the latter can contain hydrogen after vitrification. If the hydrogen concentration is above the above-named maximum limit of $1\times10^{18}$ molecules/cm$^3$, it is necessary to drive the hydogen out of the core glass. In the method of the invention, the hydrogen content of the core glass is adjusted to a level below $1\times10^{18}$ molecules/cm$^3$ before a fiber is drawn from the preform. To adjust the hydrogen content the core glass can be subjected to a separate treatment; the adjustment, however, can also be made in connection with a process step during the production of the preform, wherein the hydrogen content of the entire preform (core glass plus jacket glass) is usually affected.

Regarding the effects of the hydrogen content on UV damage of an optical fiber that is drawn from a preform made from the core glass, see the explanations given above concerning the core glass of the invention.

A process has proven especially advantageous in which the hydrogen content of the core glass is adjusted, prior to the drawing of the optical fiber, to a level below $1\times10^{17}$ molecules/cm$^3$. An optical fiber thus made is characterized by an especially good long-term stability against high-energy UV radiation and an especially low level of absorption induced by UV radiation.

In this respect, a process also has proven practical in which the hydroxyl group content of the core glass before drawing is adjusted to at least 100 wt.-ppm. Hydroxyl groups improve the radiation resistance of the core glass. Owing to the method of manufacture no separate treatment is necessary for the adjustment of the hydroxyl group content, since it usually proves to be above the stated bottom limit during the production of the core glass. The hydroxyl group content is, like the hydrogen content, measured in the central region of the core glass, although the hydroxy group content is determined spectroscopically.

In a preferred process variant, the hydrogen content of the core glass is adjusted to a level of at least $2\times10^{15}$ molecules/cm$^3$ before drawing the fiber. From a preform with a core glass in which the hydrogen content is adjusted below this level, an optical fiber is obtained which can exhibit poor resistance to UV damage. See the above explanations in connection with the core glass of the invention.

For resistance to damage from UV radiation, the hydrogen content of the core glass is adjusted before drawing to an optimum that is between $1\times10^{18}$ molecules/cm$^3$ and $2\times10^{15}$ molecules/cm$^3$, preferably between $1\times10^{17}$ and $2\times10^{15}$ molecules/cm$^3$. In a core glass with a hydrogen content below the stated bottom limit it is therefore advantageous to enrich it with hydrogen before the fiber drawing process. The enrichment of the core glass with hydrogen can be performed in a separate treatment, or on the complete preform, or in connection with a step in the process of making the preform.

It is found that an excessively low hydrogen content in the core glass before the fiber is drawn can impair the UV damage resistance of the fiber. A possible explanation of this effect is that it requires a certain hydrogen content in the core glass of the preform if the formation of NBOH centers and/or precursor defects for NBOH centers during the drawing are to be avoided. NBOH centers produce a broad absorption band at a wavelength of approximately 265 nm. Therefore they make themselves undesirably apparent especially in the transmission of UV radiation of a wavelength within this absorption band, but less in the case of UV radiation of a wavelength below 200 nm. This disadvantageous effect can be compensated by an additional measure which will be further explained below.

A process shows itself to be especially effective, in which a quartz glass containing hydrogen is produced, in which the adjustment of the hydrogen content comprises a hydrogen reduction treatment to which the hydrogen-containing quartz glass is subjected during the formation of the core glass. Due to the presence of hydrogen in the formation process, the core glass contains hydrogen after vitrification. It can therefore be necessary to drive the hydrogen out of the core glass. By the hydrogen reduction treatment, the hydrogen content can be adjusted repeatably prior to the drawing of the fiber from an initial high concentration to a second, lower concentration. The preforms thus produced therefore yield optical fibers having a defined resistance to UV damage.

The core glass is subjected to the hydrogen reduction treatment usually in a separate process step. The hydrogen reduction treatment can also, however, be performed on the complete preform (core glass plus jacket glass), or in connection with a process step for the preparation of the preform. For example, hydrogen is driven simultaneously from the core glass and from the jacket glass, and thus the harmful effect of this hydrogen in the following fiber drawing is reduced.

The adjustment of the hydrogen content advantageously comprises a heat treatment of the core glass, a treatment under vacuum, and/or a treatment in a chemically reactive atmosphere. The variant treatments stated can be applied alternatively or cumulatively. However, a heat treatment (called "annealing" hereinafter) has proven especially effective. The annealing is performed in a hydrogen-free atmosphere, e.g., under inert gas or in a vacuum, in order to reduce the hydrogen content of the core glass, and in a hydrogen-containing atmosphere under standard pressure or excess pressure in order to increase the hydrogen content of the core glass. Due to the temperature elevation during annealing the hydrogen diffuses especially rapidly in quartz glass. As hydrogen is driven out, first the regions near the surface are depleted and later the center regions are depleted of hydrogen.

It is therefore necessary to see that the hydrogen content is removed sufficiently especially in the region which is most greatly stressed optically by the intended use of the fibers made from the core glass; that is generally precisely the central regions of the fiber. On the other hand care must be taken to see that the hydrogen content is not set below the above-stated bottom limit of $2\times10^{15}$ molecules/cm$^3$, since this too can prove disadvantageous.

It has proven especially advantageous to charge the fibers with hydrogen after drawing them from the preform. The hydrogen charging has a positive effect on the UV stability of the optical fiber, regardless of whether the fiber is or is not drawn from a preform according to the invention. In an optical fiber prepared according to the invention, however, hydrogen charging leads to an especially evident improvement of resistance to damage by UV radiation. On account of the high concentration of precursor centers in the hydrogen-charged fibers according to the state of the art, they are quickly transformed at the beginning of UV radiation to absorbing defect centers (E' and NBOH centers), which leads to rapid initial damage. In hydrogen charged fibers according to the invention, however, only a few UV absorbing defect centers are formed on account of the low precursor concentration at the beginning of UV irradiation, and they can effectively be desaturated by the molecular hydrogen that is present. This desaturation can be represented as follows:

$$\equiv Si\cdot + \tfrac{1}{2}H_2 \rightarrow \equiv Si-H$$

$$\equiv SiO\cdot + \tfrac{1}{2}H_2 \rightarrow \equiv Si-OH$$

This applies especially to fibers which have been drawn from a preform with a core glass which prior to drawing had a hydrogen content that is below a hydrogen content that is optimum as regards UV damage. As it has already been mentioned above, the optimum hydrogen content of the core glass is to be assumed to be between $1\times10^{18}$ molecules/cm$^3$ and $2\times10^{15}$ molecules/cm$^3$, preferably between $1\times10^{17}$ molecules/cm$^3$ and $2\times10^{15}$ molecules/cm$^3$. In the case of a hydrogen content below this optimum, NBOH centers evidently form increasingly when the fiber is drawn and produce a broad absorption band at a wavelength of about 265 nm which is further intensified by UV radiation. Surprisingly, this disadvantageous effect can be eliminated completely or nearly completely by charging the fiber with hydrogen after its production. This can be explained by the fact that the range around the optimum hydrogen content of the core glass, as it is explained above, is expanded by the later hydrogen charging of the fiber towards lower hydrogen contents.

Preferably, therefore, the fiber is formed with a core, and at least in the fiber core the hydrogen charging establishes a hydrogen content of at least $1\times10^{18}$ molecules/cm$^3$.

BRIEF DESCRIPTION OF THE DRAWINGS

The invention is explained below with the aid of embodiments and a drawing. In the drawing.

Figure 1:
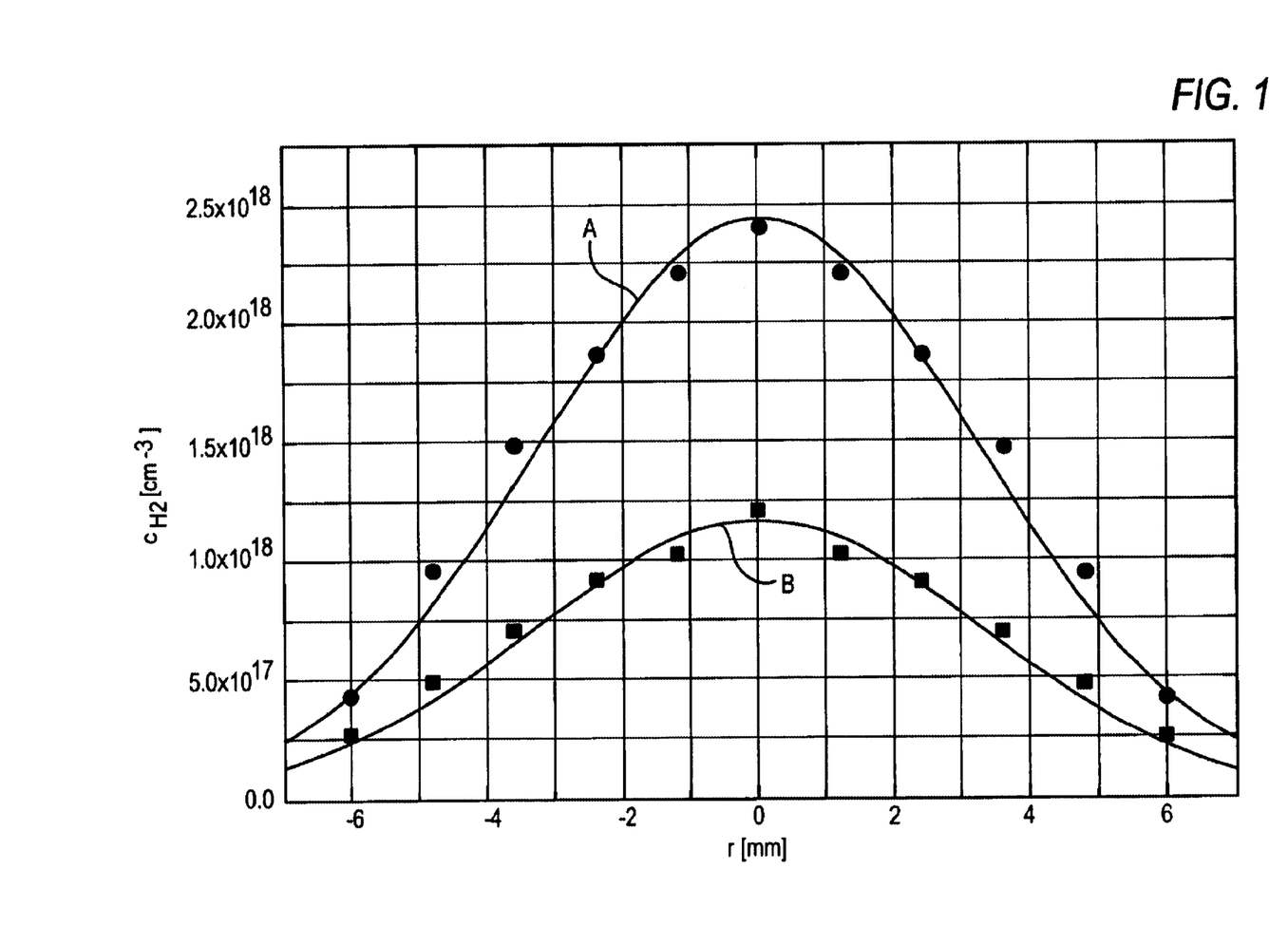
FIG. 1 shows a profile of the local distribution of molecular hydrogen across the radial cross section of a core rod of a preform, before and after the hydrogen reduction treatment, FIG. 2 a characteristic damage spectrum of two optical fibers produced according to the invention, compared with a standard fiber, in each case after irradiation with an ArF laser, FIG. 3 a characteristic damage spectrum of two optical fibers according to the invention, compared with a standard fiber, in each case after charging with hydrogen and irradiation with an ArF laser.

In the case of the local distribution of hydrogen over the cross section of a core rod of a preform represented in FIG. 1, the distance r from the center axis of the core rod is plotted on the x-axis, and the absolute hydrogen content $c_{H2}$ on the y-axis in units of molecules/cm$^3$. The preform has an outside diameter of 15 mm. The ratio of outside diameter to core diameter is 1.1. The curve A shows the radial hydrogen distribution immediately after production of the preform by drawing a plasma-coated mother preform whose core rod has been made by flame hydrolysis of $SiCl_4$ according to the DQ process, and curve B shows the hydrogen distribution across the same preform after 6 hours of annealing in a hydrogen-free atmosphere, standard pressure, and at a temperature of 800° C. From this it is evident that, after this hydrogen reduction treatment, a maximum hydrogen content of slightly more than $1\times10^{18}$ molecules/cm$^3$ is measured in the center of the core rod. In order to reach the limit hydrogen content in the meaning of this invention, which is $1\times10^{18}$ molecules/cm$^3$, a slightly longer annealing would thus have been necessary in this example.

Figure 2:
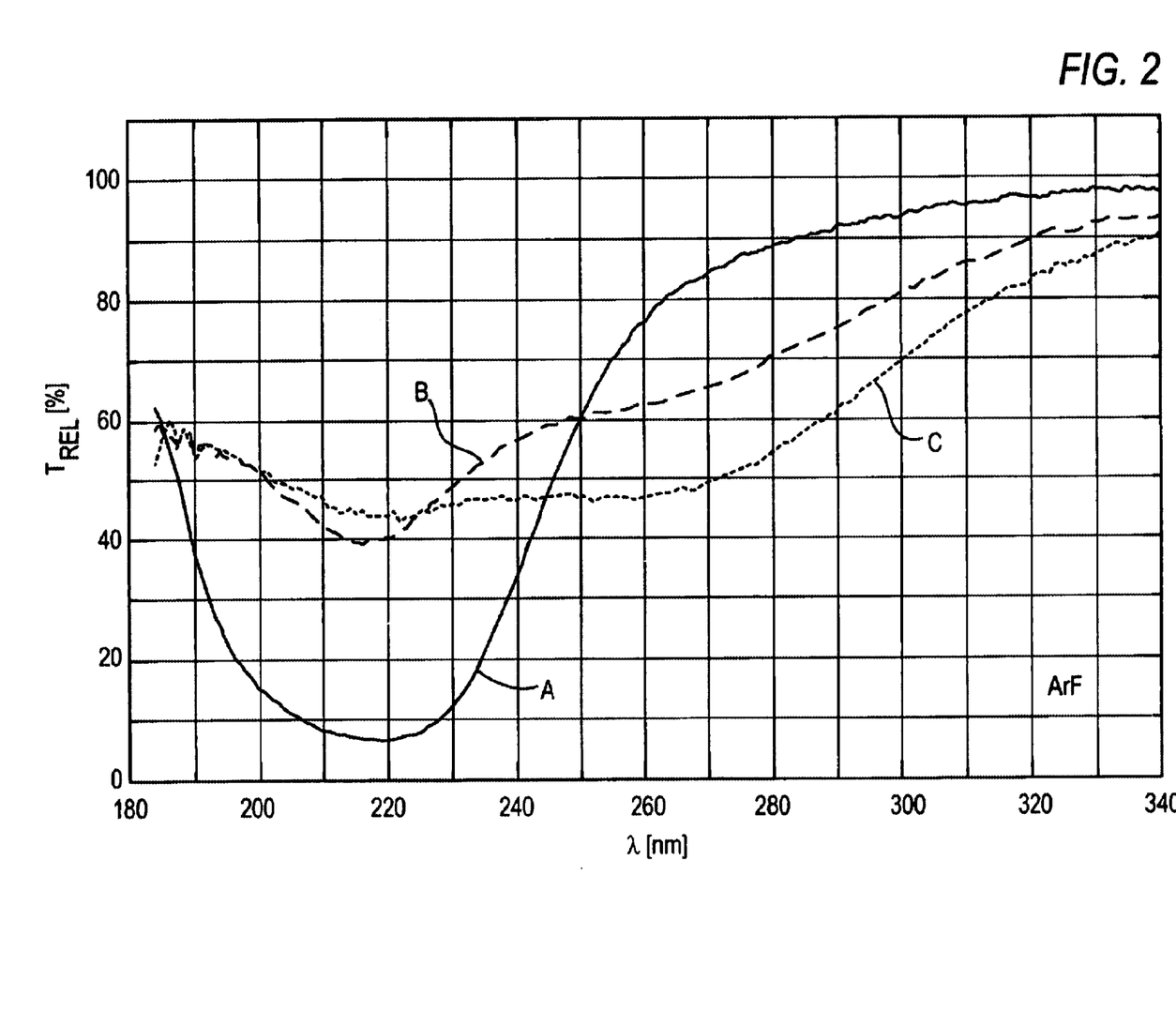

In the diagram of FIG. 2, the damage spectra (curves A, B and C) of different optical fibers are represented. The fibers were drawn under the same conditions from a preform with a diameter of 15 mm, as it was described in FIG. 1. The fibers obtained therefrom consists of an undoped core of synthetic quartz glass with a core diameter of 200 μm, and a jacket of fluorine-doped synthetic quartz glass. The measured length of the fibers is 1 meter each.

The x-axis of the diagram here describes the measured wavelength in units nm, the y-axis the relative transmission $T_{REL}$ of the corresponding fiber in percent (of the initial value of the transmission). The damage spectra were recorded spectroscopically immediately after irradiation with a pulsed ArF laser (193 nm). The radiation parameters used are: energy density=50 mJ/cm$^2$, repetition rate=10 Hz, and pulse length=15 ns.

Curve A shows the UV damage characteristic of a standard fiber (fiber A). This one was obtained from an untreated standard preform. The hydrogen content in the central axis of the core glass of the standard preform was approximately $2\times10^{18}$ molecules/cm$^3$ before the fiber was drawn. Curves B and C show UV damage characteristics of optical fibers which had been drawn from preforms which had been annealed previously at 800° C. and standard pressure. In the fiber of curve B the annealing time was 24 hours (fiber B), and in the fiber of curve C 120 hours (fiber C). In the preform from which fiber B was obtained the hydrogen content in the central axis of the core glass was about $1\times10^{17}$ molecules/cm$^3$ after annealing and before drawing the fiber. In the core glass of the preform for fiber C no hydrogen was detectable by the ordinary methods after annealing.

The UV damage spectrum of fiber A clearly shows the characteristic strong absorption at a wavelength around 215 nm, which is to be attributed to the formation of E' centers by the UV radiation. This damage is markedly suppressed in the fibers (B and C) made according to the invention. Moreover it becomes clear that, as the hydrogen content of the core glass decreases (increasing preform annealing time) the formation of E' centers is suppressed, but on the other hand, after UV radiation an absorption band forms around 265 nm which is to be attributed to the development of NBOH centers. For the transmission of UV radiation of a wavelength around 200 nm, as for example the transmission of UV radiation from an ArF laser (193 nm), a fiber made according to the invention (fibers B and C) is clearly superior to the standard fiber (fiber A), since the laser-induced additional attenuation at the wavelength of 193 nm turns out to be substantially lower. Due to the induced absorption around 265 nm, which was observed in the fibers from annealed preforms, the standard fiber is, however, apparently superior at 248 nm to fibers B and C. This result, however, is relativized by the following damage spectrums explained with the aid of FIG. 3.

Figure 3:
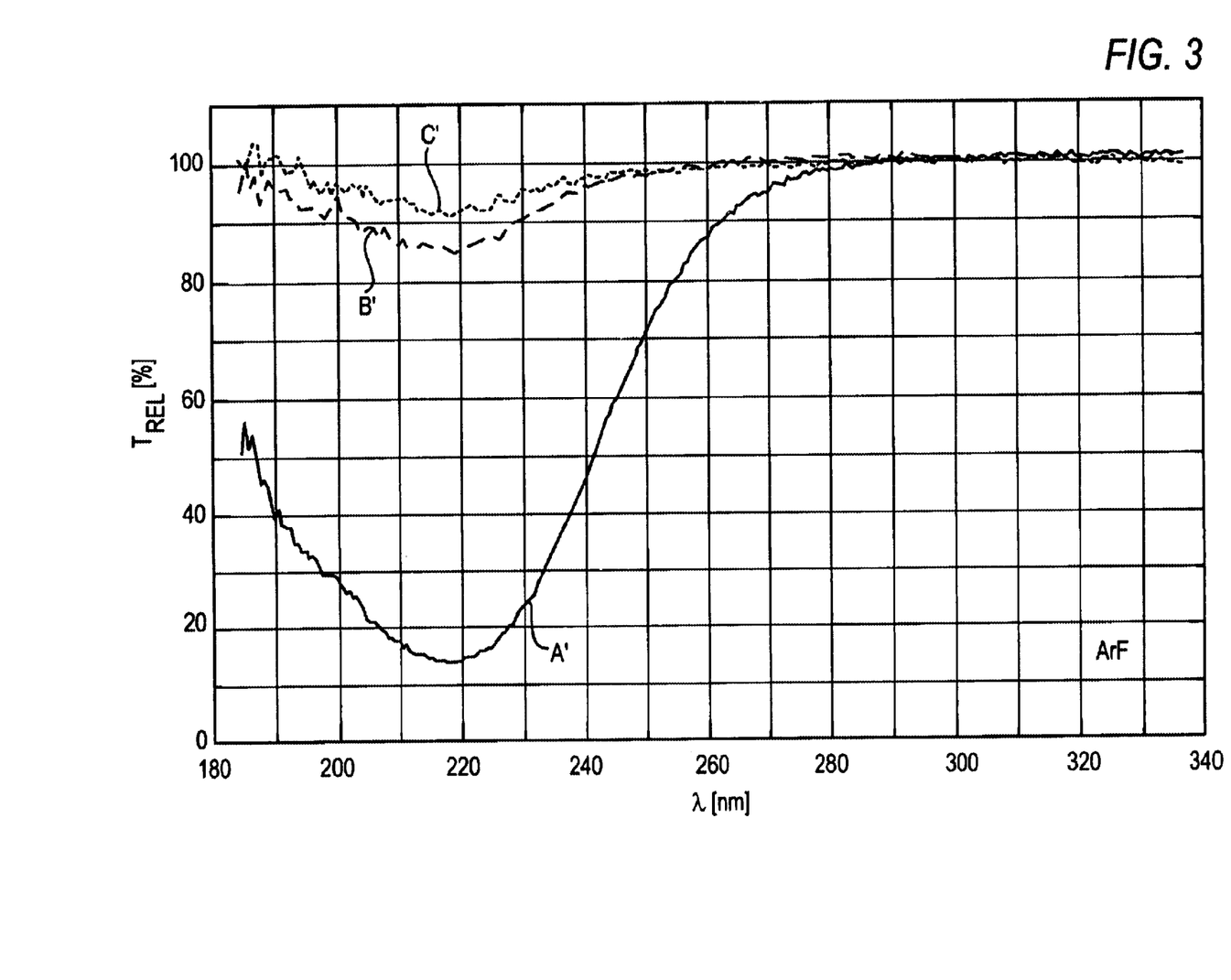

The diagram of FIG. 3 is based on the same radiation experiment as in FIG. 2. Damage spectrums A', B' and C' are shown for optical fibers whose geometry and production were the same as those of the fibers A, B and C explained with the aid of FIG. 2. In addition, the optical fibers A', B' and C', however, were charged with hydrogen after the drawing process. This was performed at 80° C. for 10 days under a pressure of 115 bar in a hydrogen atmosphere.

The damage spectra of FIG. 3 show that the hydrogen charging in the case of the standard fiber (curve A') has no substantial effect on the damage curve in the area around 215 nm.

The standard fiber still shows a strong induced absorption in this range, which is to be attributed to the development of E' centers. On the other hand the fibers B' and C' (curve B': 24-hour annealed preform, curve C': 124-hour annealed preform) show after hydrogen charging a clear improvement in their damage performance in 193 nm radiation. Over the entire UV spectrum fibers B' and C' solarize hardly at all, and in particular the absorption band around 265 nm no longer occurs after hydrogen charging.

Figure 4:
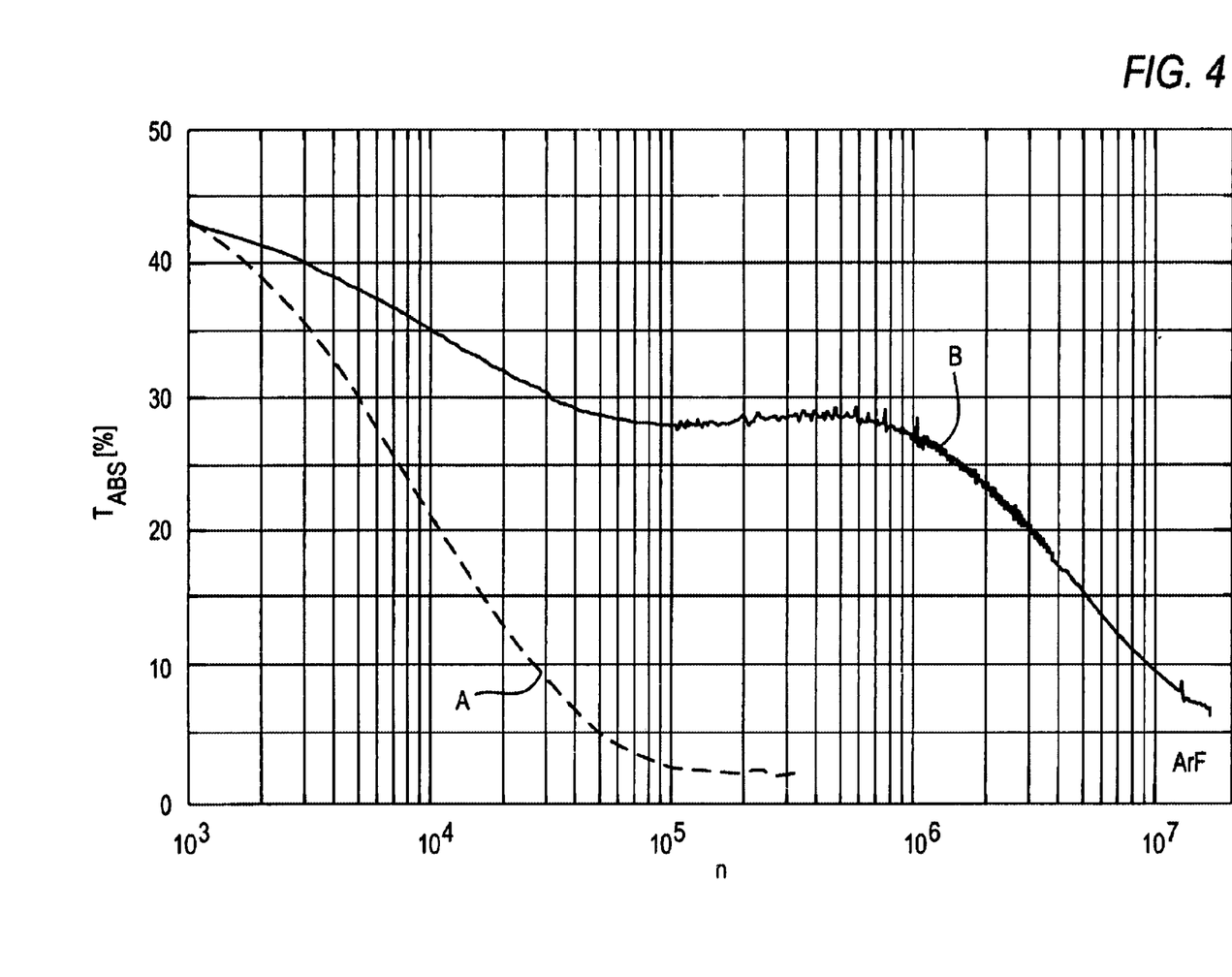
FIG. 4 a characteristic long-term damage characteristic of an optical fiber according to the invention, compared with a standard fiber, in each case after irradiation with an ArF laser.

The advantage of fibers made according to the invention becomes especially apparent in the case of long-term irradiation with an ArF laser, the results of which are shown in the diagram of FIG. 4. The x-axis represents the number n of laser pulses and the y-axis the absolute transmission $T_{ABS}$ of the tested fiber in percent (radiation power output with respect to the radiation power input).

Represented are the damage curves (curve A and curve B) of two optical fibers A and B during irradiation with UV light of a wavelength of 193 nm. The measured wavelength is likewise 193 nm. The radiation is performed here with an energy density of 5 mJ/cm$^2$, a repetition rate of 400 Hz and a pulse length of 15 ns.

The geometry and the production of fibers A and B are the same as those of fibers A and B explained with the aid of FIG. 2. The irradiated fibers A and B were 1 meter long and had a core diameter of 200 μm.

FIG. 4 shows that the standard fiber is so severely damaged by the radiation parameters described after only 10$^5$ laser pulses that the transmission falls below 3% (curve A). The fibers produced according to the invention, however, show, even after 10$^6$ pulses, definitely more than 25% transmission (curve B).

Figure 5:
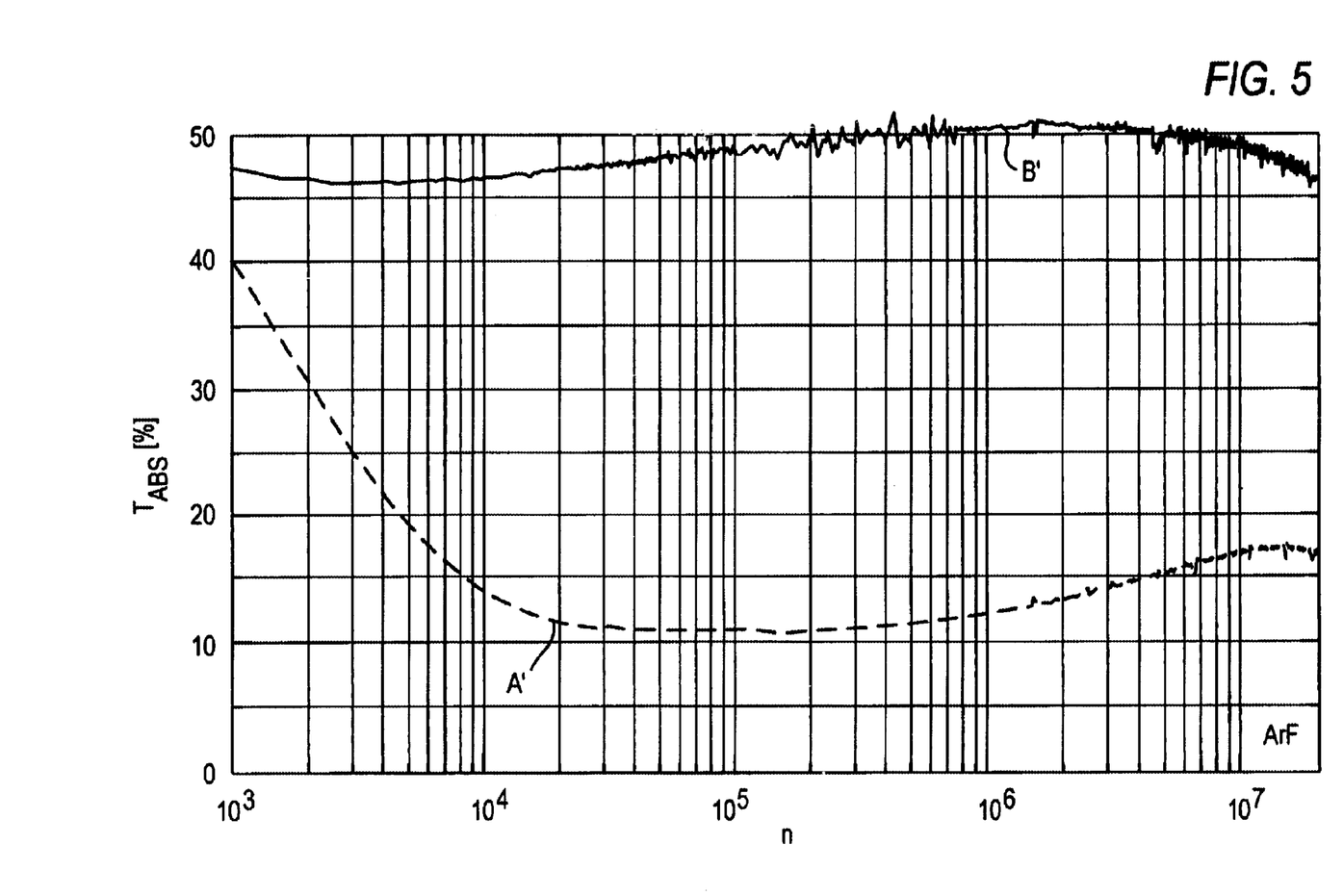
FIG. 5 a characteristic long-term damage characteristic of an optical fiber according to the invention, compared with a standard fiber, in each case after charging with hydrogen and irradiation with an ArF laser.

The diagram of FIG. 5 is based on the same radiation experiment as in FIG. 4. Damage curves A' and B' are shown for optical fibers whose geometry and production were the same as those of fibers A' and B', which means that fibers A' and B' were charged with hydrogen after they were drawn. (Charging parameters explained with the aid of FIG. 3)

The hydrogen-charged standard fiber (curve A') is very greatly damaged during the first 10$^4$ laser pulses, and the absolute transmission of the standard fiber falls below 20% and remains below that level even after long irradiation (high pulse numbers). The fibers made according to the invention and afterward charged with hydrogen (curve B') is not damaged over an irradiation period of 2×10$^{17}$ laser pulses.

Figure 6:
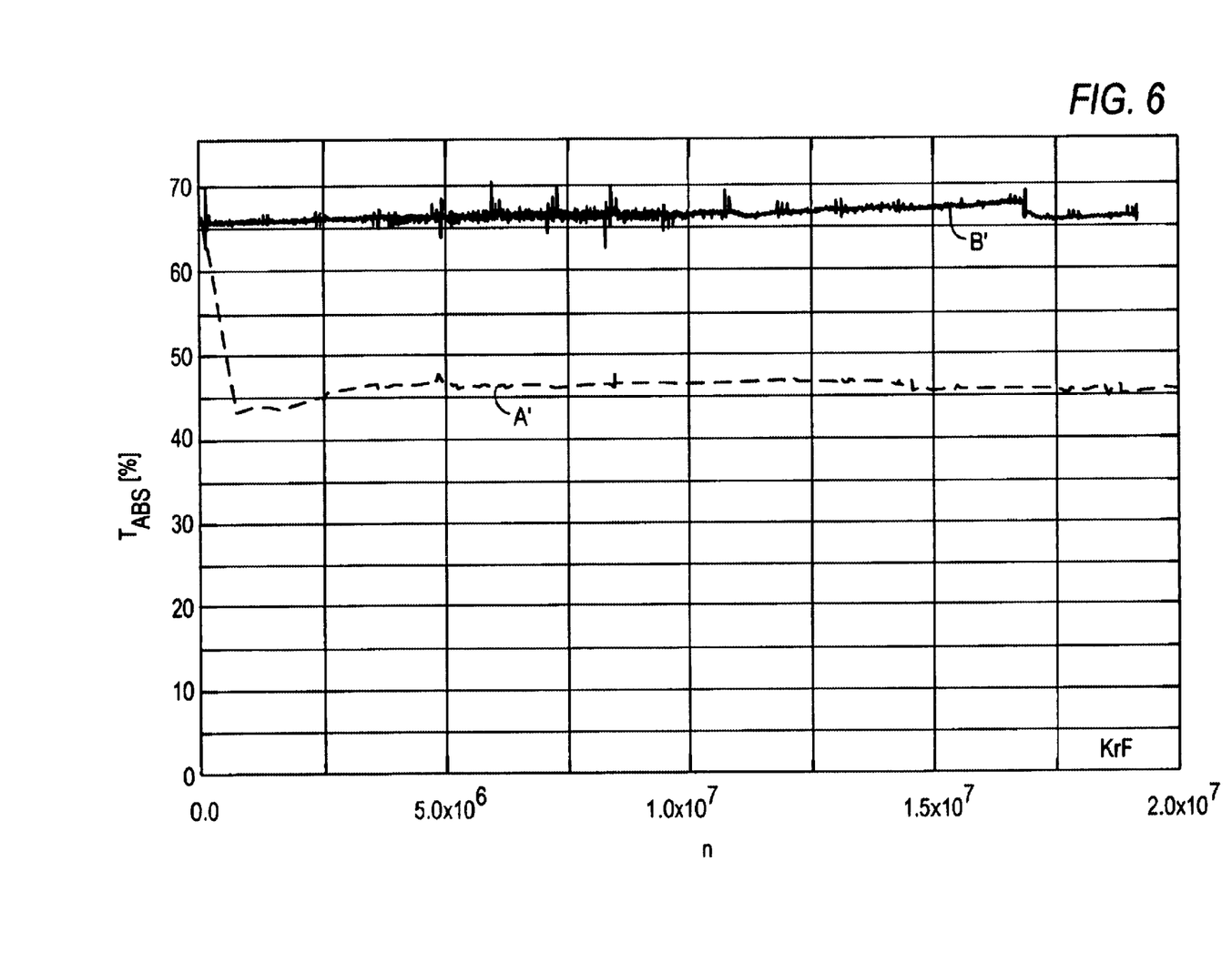
FIG. 6 a characteristic long-term damage characteristic of an optical fiber according to the invention, compared with a standard fiber, in each case after charging with hydrogen and irradiation with a KrF laser.

The measurements made according to FIG. 6 are based on the same experiment as in FIG. 5, except that the radiation was here performed with a KrF excimer laser with a wavelength of 248 nm, the energy density being 5 mJ/cm$^2$, the repetition rate 500 Hz and the pulse length 15 ns. The same fibers were used for the experiment as in FIG. 5. Since the basic damping is lower at the selected wavelength, however, than it is at 193 nm, the fiber length was established at 3 meters.

The absolute transmission $T_{ABS}$ of the standard hydrogen-charged fiber A' drops rapidly within the first 10$^6$ pulses from about 65% to about 45% and then remains at this level up to a pulse number of 2×10$^7$ laser pulses. The height of this plateau depends probably on the concentration of precursor centers in the fiber. On the other hand, the hydrogen-charged fiber B' of the invention is not harmed at all.

Figure 7:
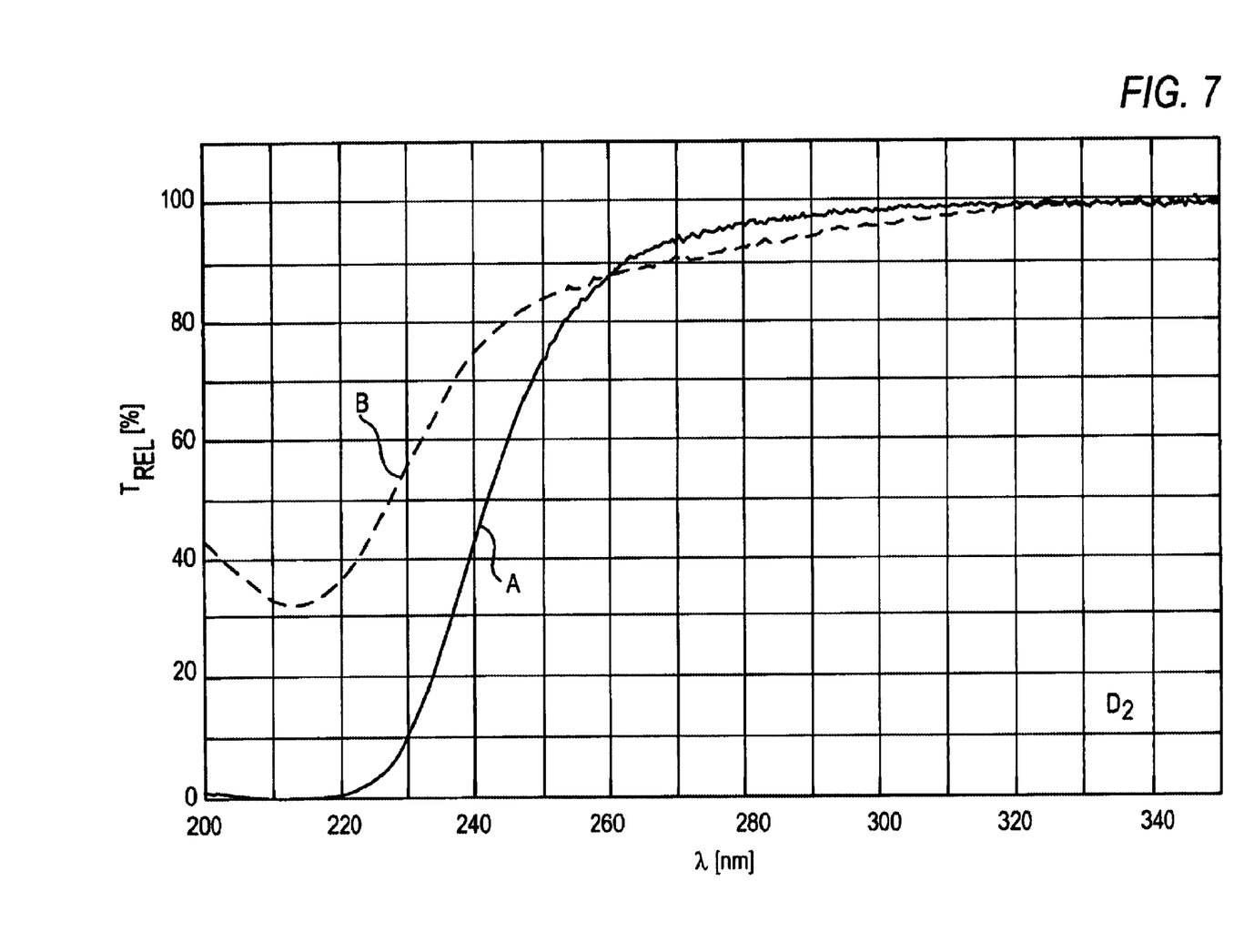
FIG. 7 a characteristic long-term damage characteristic of an optical fiber according to the invention, compared with a standard fiber, in each case after irradiation with a deuterium lamp, and FIG. 8 a characteristic long-term damage characteristic of an optical fiber according to the invention, charged with hydrogen, compared with a hydrogen charged standard fiber, in each case after irradiation with a deuterium lamp.

The diagram represented in FIG. 7 is based on an experiment similar to the diagram of FIG. 2. The diagram of FIG. 7 shows two damage spectra A and B which were measured on fibers A and B after irradiation with a deuterium lamp. The production and geometry of fibers A and B are (except for their length) the same as those of Fibers A and B as described with the aid of FIG. 2 (in the experiment according to FIG. 6 the fibers A and B have a length of 2 m).

The x-axis corresponds to the UV wavelength in nm, the y-axis to the relative transmission of the fibers in percent (of the initial value of the transmission). In this experiment the fibers A and B were each irradiated for two hours with a high-power deuterium lamp whose spectral power density at the wavelength of 215 nm amounts to 70 nW/nm.

After the stated radiation time the standard fiber (curve A) is so severely damaged that the transmission at 215 nm (E' center) has dropped to 0%. The fiber made according to the invention (curve B), however, is much less damaged; the relative transmission after 2 hours of radiation is still more than 30%.

Figure 8:
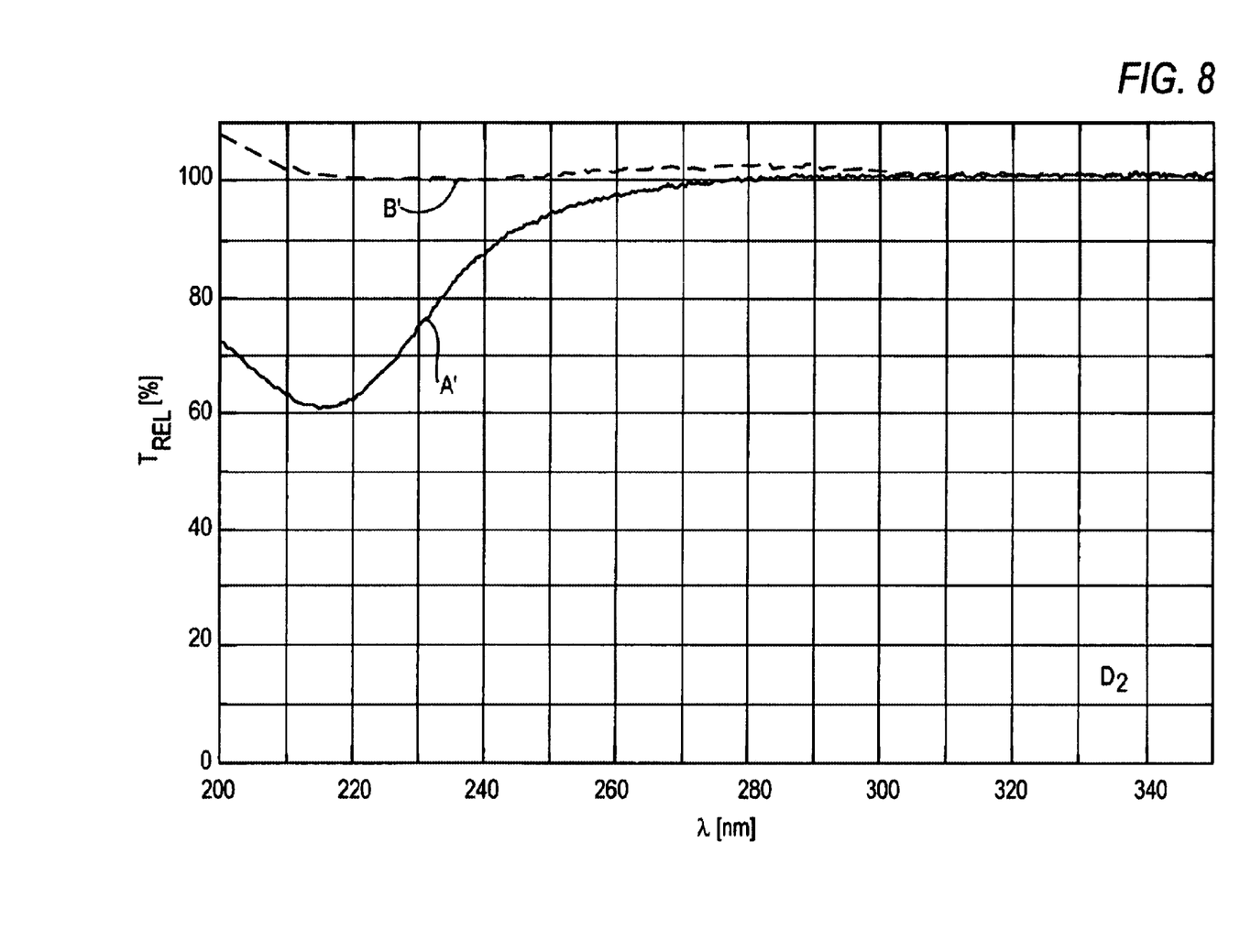

FIG. 8 is based on the same experiment in radiation with a deuterium lamp, as explained with the aid of FIG. 7. The hydrogen-charged fibers A' and B' (length 2 m) were used as described in connection with FIG. 3.

In this case too, the hydrogen-charged standard fiber (curve A') is severely damaged after 2 hours of radiation at a wavelength of 215 nm. The hydrogen-charged fiber (curve B') made according to the invention, however, does not solarize under the same test conditions.

The preparation of a core glass of a preform for an optical fiber and a fiber according to the invention is explained below with the aid of an example:

A disk-shaped substrate is arranged so that one of its flat sides faces vertically downward. Under the substrate there is placed a depositing torch which has a center nozzle which is surrounded coaxially by four ring nozzles. The depositing torch is aimed at the substrate, which rotates about its central axis. The middle nozzle of the depositing torch is fed with silicon tetrachloride in a carrier gas (nitrogen), and (successively from the inside out) a separating gas (nitrogen) oxygen and, on the outside, hydrogen. Oxygen and hydrogen react together to form an oxyhydrogen gas in which the silicon tetrachloride issuing from the center nozzle is hydrolyzed and deposited in the form of finely divided synthetic $SiO_2$ on the substrate. The $SiO_2$ deposited on the substrate is vitrified immediately by the heat of the oxyhydrogen gas flame with the formation of a rough quartz glass rod. The rod thus obtained consists of synthetic quartz glass which has an OH content of about 700 wt.-ppm and a relatively high hydrogen content of more than $2\times10^{18}$ molecules/cm$^3$.

1. Variant Process for the Preparation of a Core Glass According to the Invention In a first variant a core glass in the meaning of this invention is prepared from the rough rod by drawing the rod to a round rod with a diameter of 15 mm, and then it is subjected to a hydrogen reduction treatment. For this purpose the round rod is annealed in a vacuum at 800° C. for a period of 24 h. Thereafter the round rod has across its pure cross section a hydrogen concentration profile similar to the one shown in FIG. 1, the maximum hydrogen content in the area of the long axis of the rod being at a level of approximately $1\times10^{17}$ molecules/cm$^3$. The OH content of the core glass is still about 700 wt.-ppm.

For the preparation of a preform, the core glass thus prepared is provided by external deposition (plasma process or OVD process) or by the rod-in-tube technique with an optical jacket, as will be further described below.

2. Variant Method for the Preparation of Core Glass and Fiber According to the Invention In a second variant method a core glass in the meaning of the invention is produced from the raw rod described above by producing a core rod from it by drawing, on the cylindrical outer surface thereof a fluorine-doped SiO$_2$ jacket glass layer is deposited by a plasma coating method. The depositing process is described in U.S. Pat. No. 4,162,908. The fluorine content of the jacket glass is adjusted to approximately 5 wt.-%, and the ratio of the outside diameter to the core rod diameter is adjusted to 1.1. This mother preform is elongated to an outer diameter of 15 mm, resulting in a preform.

To reduce the hydrogen content in the core rod, the preform obtained is annealed at 800° C. in a furnace in an air atmosphere for 24 hours. The hydrogen content in the core glass of the preform is lowered by the said annealing from $2\times10^{16}$ molecules/cm$^3$ to $1\times10^{17}$, molecules/cm$^3$. The OH content of the hydrogen-reduced core glass thereafter continues to be about 700 wt.-ppm.

For the production of the optical fiber the preform according to the first or second process variant, which contains the reduced-hydrogen core glass, is drawn to an optical fiber with an outside diameter of 220 μm. The optical fiber is coated during the drawing process with a common commercial acrylate coating.

After drawing, the optical fiber is subjected to hydrogen charging. This is performed by exposing the optical fiber to a hydrogen atmosphere in an autoclave at 80° C. and 150 bar for a period of 10 days. After the hydrogen charging the hydrogen content of the fiber core is approximately $5\times10^{19}$ molecules/cm$^3$.

What is claimed is:

1. Method for the manufacture of an optical fiber by drawing from a preform which comprises a core glass of synthetic quartz glass which is formed by flame hydrolysis of a silicon compound, deposition of finely granular SiO$_2$ on a substrate with direct vitrification and formation of the synthetic quartz glass, characterized in that the core glass is adjusted prior to drawing to a hydrogen-content of less than $1\times10^{18}$ molecules/cm$^3$.

2. Method for the manufacture of an optical fiber according to claim 1, characterized in that the core glass is adjusted to a hydrogen content of no more than $1\times10^{17}$ molecules/cm$^3$.

3. Method according to claim 1, characterized in that the core glass is adjusted to a hydroxyl group content of at least 100 wt.-ppm.

4. Method according to claim 1, characterized in that the core glass is adjusted to a hydrogen content of at least $2\times10^{15}$ molecules/cm$^3$.

5. Method according to claim 1, characterized in that the adjustment of the hydrogen content comprises a heat treatment, a treatment under vacuum, and/or a treatment of the core glass in a chemically reactive atmosphere.

6. Method according to claim 5, characterized in that the core glass is annealed at a temperature of at least 600° C.

7. Method according to claim 1, characterized in that the fiber is charged with hydrogen after drawing from the preform.

8. Method according to claim 7, characterized in that the fiber is formed with a fiber core, and that a hydrogen content of at least $1\times10^{18}$ molecules/cm$^3$ is set by the hydrogen charging, at least in the fiber core.

* * * * *